UNITED STATES PATENT OFFICE.

HEINRICH TRAUN, OTTO TRAUN, AND MAX TRAUN, OF HARBURG-ON-ELBE, PRUSSIA, GERMANY.

MANUFACTURE OF HARD RUBBER OR VULCANITE.

SPECIFICATION forming part of Letters Patent No. 226,572, dated April 13, 1880.

Application filed March 18, 1880. (Specimens.) Patented in Germany October 30, 1878, in France November 23, 1878, in England December 3, 1878, and in Austro-Hungary May 14, 1879.

*To all whom it may concern:*

Be it known that we, HEINRICH TRAUN, OTTO TRAUN, and MAX TRAUN, of Harburg-on-Elbe, Kingdom of Prussia, German Empire, have invented certain new and useful Improvements relating to the Employment of Glass for Vulcanizing India-Rubber in the Manufacture of Hard Rubber or Vulcanite, of which the following is a specification.

The present extended use of hard rubber or vulcanite is due to its many valuable qualities, more particularly to its jet-black color, and to the brilliant black polish which it retains after certain manipulations.

Hitherto these manipulations of polishing hard rubber have been very laborious and costly, not unfrequently doubling the cost of production. In cases of articles of complicated form the cost of labor in polishing would often be such as to preclude their sale.

The present invention is designed to enable superior polish to be produced, whether on flat sheets or on articles molded in various shapes, also to produce an even surface without extra labor, by using a certain material for the plates and molds used for vulcanizing hard rubber or vulcanite.

As is well known, vulcanite or hard rubber is manufactured by subjecting certain soft compounds mixed according to certain proportions to a certain degree of heat in the vulcanizing apparatus, whereby the intimate chemical combination of the different ingredients, the consistency, the blackness, and the elasticity peculiar to vulcanite or hard rubber are finally attained. During the process of vulcanization the rubber must, however, be protected against the destructive effect of the water, steam, or gases contained in the heater or vulcanizing apparatus; otherwise the blackness will suffer, and the surface of the vulcanite will be materially injured and roughened. Talc has been used to protect the material; but the surface thus attained on articles of hard rubber, although the blackness is somewhat protected, is by no means smooth, and the manipulation of polishing remains very expensive.

In 1854 L. Otto Meyer, engineer, discovered tin-foil to be a superior envelope for the protection of the surface of hard rubber during the process of vulcanization. He consequently applied for and was granted a patent for the United States, dated April 4, 1854, extended May 5, 1868, for seven years. The use of tin-foil in the manufacture of hard rubber or vulcanite has since proved of the utmost importance. Up to the present date tin-foil or its alloys are almost exclusively employed by all hard-rubber manufacturers for the protection of the surface of soft-rubber compounds during the process of vulcanization.

Now, although by the aid of tin-foil a tolerably black and smooth surface is obtained and the manipulation of polishing is thereby made considerably more easy, yet serious obstacles remain. On large sheets the surface frequently appears undulated and takes from the tin-foil a glossy metallic appearance which greatly impedes the polishing.

Now, we have discovered that glass constitutes a medium far superior to tin molds or tin-foil (when used as a substitute for them) for preserving and protecting vulcanite during the process of vulcanization against the destructive influence of steam, &c., as hereinbefore set forth.

According to this invention, in order to produce vulcanite or hard-rubber sheets with lustrous and level surfaces, the vulcanizing is effected on plate-glass. By this process the vulcanite or hard-rubber sheets leave the vulcanizing apparatus (heater) with a jet-black polish on their surfaces superior in finish to those attained by existing polishing manipulations, and resembling in fineness a plate-glass surface.

To produce articles of various shapes the vulcanizing is effected in cut-glass molds of appropriate forms. Opaque cut glass is employed to produce a corresponding or similar surface to that of such glass on vulcanite sheets, and glass plates or molds, cut, corroded, or blown, or ornamented in other ways, are employed to produce similar surfaces to their own on the vulcanite, which effect is obtained without further finishing being requisite.

Having described the nature of the said invention and explained the manner of carrying it into practical effect, we would have it understood that in carrying out this invention, glass in all its different compositions, qualities, and shapes may be used for the vulcanization of vulcanite without departure from the essential characteristic of the invention, as respects which—

What we consider to be novel and original, and therefore claim as secured to us by the patent, is—

The use of glass in the manufacture of vulcanite or hard rubber, substantially as hereinbefore described.

In testimony whereof we have hereunto set our hands this 30th day of January, 1880, in the presence of two subscribing witnesses.

HEINRICH TRAUN.
OTTO TRAUN.
MAX TRAUN.

Witnesses:
HERMANN COLPE,
THEODOR MOHRVINCKEL,
*Both of Harburg-on-Elbe.*